United States Patent
Daso et al.

(10) Patent No.: US 9,016,632 B1
(45) Date of Patent: Apr. 28, 2015

(54) METHOD AND SYSTEM FOR WEAKENING SHOCK WAVE STRENGTH AT LEADING EDGE SURFACES OF VEHICLE IN SUPERSONIC ATMOSPHERIC FLIGHT

(71) Applicant: The United States of America as Represented by the Administrator of the National Aeronautics and Space Administration, Washington, DC (US)

(72) Inventors: Endwell O. Daso, Madison, AL (US); Victor E. Pritchett, II, Harvest, AL (US); Ten-See Wang, Huntsville, AL (US); Rebecca Ann Farr, Gurley, AL (US); Aaron Howard Auslender, Poquoson, VA (US); Isaiah M. Blankson, Solon, OH (US); Kenneth J. Plotkin, Vienna, VA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 191 days.

(21) Appl. No.: 13/896,137

(22) Filed: May 16, 2013

(51) Int. Cl.
*B64C 1/38* (2006.01)
*B64C 23/00* (2006.01)
*B64C 30/00* (2006.01)

(52) U.S. Cl.
CPC ............... *B64C 23/005* (2013.01); *B64C 30/00* (2013.01)

(58) Field of Classification Search
USPC .................. 244/130, 204, 205, 1 N
See application file for complete search history.

(56) References Cited

U.S. PATENT DOCUMENTS

| | | | |
|---|---|---|---|
| 3,785,591 A * | 1/1974 | Stalmach, Jr. | ............. 244/171.8 |
| 5,299,762 A * | 4/1994 | Kosson et al. | ............. 244/117 A |
| 5,447,283 A | 9/1995 | Tindell | |
| 5,452,866 A | 9/1995 | Bulman | |
| 5,505,409 A | 4/1996 | Wells et al. | |
| 5,934,607 A | 8/1999 | Rising et al. | |
| 5,957,413 A | 9/1999 | Glezer et al. | |
| 6,247,671 B1 | 6/2001 | Saeks et al. | |
| 6,367,740 B1 * | 4/2002 | Johnson et al. | ............. 244/45 R |
| 6,405,653 B1 | 6/2002 | Miskelly | |
| 6,527,221 B1 | 3/2003 | Kremeyer | |
| 6,739,266 B1 | 5/2004 | Castano et al. | |
| 6,793,177 B2 | 9/2004 | Bonutti | |
| 6,849,247 B1 | 2/2005 | Wagaman et al. | |
| 7,063,288 B1 | 6/2006 | Kremeyer | |

(Continued)

OTHER PUBLICATIONS

Daso, Endwell O. et al., Dynamics of Shock Dispersion and Interactions in Supersonic Freestreams with Counterflowing Jets, American Institute of Aeronautics and Astronautics AIAA Journal, Jun. 2009, pp. 1313-1326, vol. 47 No. 6, Reston, VA.

(Continued)

*Primary Examiner* — Christopher P Ellis
(74) *Attorney, Agent, or Firm* — Peter J. Van Bergen; James J. McGroary

(57) ABSTRACT

A method and system are provided to weaken shock wave strength at leading edge surfaces of a vehicle in atmospheric flight. One or more flight-related attribute sensed along a vehicle's outer mold line are used to control the injection of a non-heated, non-plasma-producing gas into a local external flowfield of the vehicle from at least one leading-edge surface location along the vehicle's outer mold line. Pressure and/or mass flow rate of the gas so-injected is adjusted in order to cause a Rankine-Hugoniot Jump Condition along the vehicle's outer mold line to be violated.

18 Claims, 4 Drawing Sheets

(56) References Cited

U.S. PATENT DOCUMENTS

| | | | |
|---|---|---|---|
| 7,121,511 | B2 | 10/2006 | Kremeyer |
| 7,123,544 | B1 | 10/2006 | Kuklinski |
| 7,226,325 | B1 | 6/2007 | Kirschner et al. |
| 7,599,805 | B2 * | 10/2009 | Pilon ............................. 702/39 |
| 2007/0095987 | A1 | 5/2007 | Glezer et al. |
| 2007/0176046 | A1 | 8/2007 | Kremeyer |
| 2008/0128561 | A1 | 6/2008 | Hyde et al. |
| 2008/0290218 | A1 * | 11/2008 | Schwimley et al. .......... 244/130 |

OTHER PUBLICATIONS

Venkatachari, B.S. et al., Long Penetration Mode Counterflowing Jets for Supersonic Slender Configuration—A Numerical Study, American Institute of Aeronautics and Astronautics AIAA Summer Fluids Conf., Jun. 24, 2013, San Diego, CA.

Ivanchenko, Oleksandr et al., Experimental Investigation of Shock Wave Attenuation/Control Using a Counterflow Jet, 46th AIAA Aerospace Sciences Meeting and Exhibit, Jan. 7, 2008, AIAA 2008-739, Reno, Nevada.

Venkatachari, B.S. et al., Numerical Investigation of the Interaction of Counterflowing Jets and Supersonic Capsule Flows, 42nd AIAA Thermophysics Conference, Jun. 27, 2011, pp. 1-19, Issue 2011-4030, Honolulu, Hawaii.

Chang, C-L et al., Unsteady Aerothermodynamics Analysis of Hypersonic Flows over a Reentry Capsule, 42nd AIAA Joint Propulsion Conference & Exhibit, pp. 1-21, Issue 2006-4776.

Daso, E.O. et al., Prediction of Drag Reduction in Supersonic and Hypersonic Flows with Counterflow Jets, AIAA/AAAF 11th International Space Planes and Hypersonic Systems and Technologies Conf., Sep. 29, 2002, pp. 1-10, AIAA 2002-5115, Orleans, France.

* cited by examiner

METHOD AND SYSTEM FOR WEAKENING SHOCK WAVE STRENGTH AT LEADING EDGE SURFACES OF VEHICLE IN SUPERSONIC ATMOSPHERIC FLIGHT

ORIGIN OF THE INVENTION

The invention described herein was made in part by employees of the United States Government and may be manufactured and used by or for the Government for governmental purposes without the payment of any royalties.

BACKGROUND OF THE INVENTION

1. Field of the Invention

This invention relates to aerodynamic reshaping of the external flow environment around a vehicle in atmospheric flight. More specifically, the invention is a method and system for weakening the strength of shock waves at leading edge surfaces of a vehicle in supersonic atmospheric flight such that sonic boom is mitigated in a controlled fashion over (populated) land regions.

2. Description of the Related Art

Various high speed vehicles such as aircraft and spacecraft flying through the atmosphere in the supersonic or hypersonic flight regime are subjected to flowfields that greatly affect aerodynamic efficiency, the acoustic environment experienced by the vehicle, the aerothermal environment experienced by the vehicle, the complex shock system encountered by the vehicle, and the sonic boom created by the vehicle. The relevance and/or severity of these effects impact vehicle design, the particular flight regime and trajectory being experienced, the payload, etc.

With respect to the complex shock system (i.e., the overpressure experienced at land surfaces due to the interference of shock waves originating at a variety of leading edge surfaces of the vehicle) and sonic boom, a currently-employed sonic boom mitigation approach provides a mechanical spike at the vehicle's nose that extends forward therefrom. The spike provides some degree of sonic boom mitigation. However, since shock waves originate at a variety of an aircraft's leading edge surfaces, providing spikes at all such locations is not practical. Furthermore, a vehicle's complex shock system is dynamic thereby suggesting the need for a solution that adapts to changing shock wave conditions in flight.

SUMMARY OF THE INVENTION

Accordingly, it is an object of the present invention to provide a method and system for modifying the oncoming flowfield to significantly weaken the strength of the shock system of a vehicle in supersonic or hypersonic flight in order to mitigate the ground overpressure or the sonic boom generated by a vehicle.

Another object of the present invention is to provide a method and system that adapts to changing flowfield and flight regime conditions experienced by a vehicle in supersonic or hypersonic flight to accordingly modify the characteristics of the changing oncoming flowfield to weaken the strength of the shock waves created by the vehicle's movement.

Other objects and advantages of the present invention will become more obvious hereinafter in the specification and drawings.

In accordance with the present invention, a method and system are provided to weaken shock wave strength at leading edge surfaces of a vehicle in atmospheric flight. At least one flight-related attribute is sensed along a vehicle's outer mold line. A non-heated, non-plasma-producing gas is injected into a local external flowfield of the vehicle from at least one leading-edge surface location along the vehicle's outer mold line. At least one of pressure and mass flow rate of the gas so-injected is adjusted based on the attribute(s) in order to cause a Rankine-Hugoniot Jump Condition along the vehicle's outer mold line to be violated.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
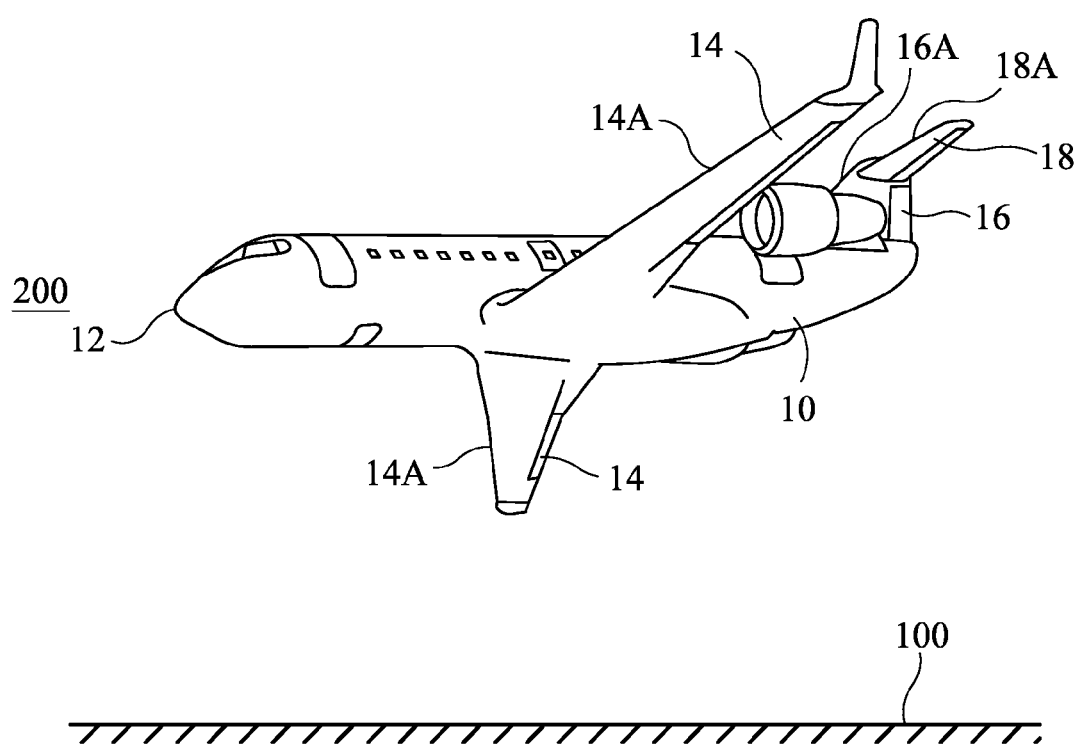
FIG. 1 is a schematic view of a winged aircraft illustrating a variety of leading edge surfaces at which shock waves originate during atmospheric flight.

Referring now to the drawings and more particularly to FIG. 1, a winged aircraft 10 is illustrated in atmospheric flight over a land region 100 (e.g., a populated land region). Aircraft 10 is assumed to be flying into a freestream region 200 of the atmosphere. During such flight, a variety of surfaces of aircraft 10 present leading edges to freestream 200 as aircraft 10 flies therethrough. In terms of shock wave generation/origination, the most prominent of the leading edge surfaces of aircraft 10 are the aircraft's nose 12, the leading edges 14A of wings 14, the leading edge 16A of vertical stabilizer 16, and the leading edges 18A of horizontal stabilizers 18 (only one of which is visible in FIG. 1). Additional sources of shock wave generation/origination could include a leading edge of any other protuberance from the aircraft's outer mold line (e.g., engines, antennas, antenna pods, etc.) that can typically be found on an aircraft.

As aircraft 10 flies supersonically into freestream 200, shock waves are generated at the various leading edge surfaces of aircraft 10. These shock waves interfere with one another as aircraft 10 flies through freestream 200 to form a differential pressure wave that is known in the art as the N-wave. As aircraft 10 transitions into or travels in supersonic or hypersonic flight, sudden changes in pressure between freestream 200 and the region just forward of the aircraft's leading edge surfaces causes the sonic boom condition when the N-wave reaches land region 100. The present invention weakens the strength of the shock waves at one or more of the leading edge surfaces to thereby reduce or eliminate sonic boom in a controlled fashion as aircraft 10 flies over land region 100. More specifically, the properties of the upstream flowfield of a vehicle traveling in supersonic or hypersonic atmospheric flight are actively modified in the present invention by the injection of cold gas in long penetration mode into the upstream flowfield. A "long penetration mode" is achieved when the second partial derivative over some reference volume with respect to entropy is negative. This acts to create a Bethe-Zel'dovich-Thompson (BZT) condition where the parameter Γ (Gamma) is negative, or less than zero, such that $$\Gamma = 1 + \frac{\rho}{a}\left(\frac{\partial a}{\partial \rho}\right)_s = 1 + \frac{\rho}{2a^2}\left(\frac{\partial^2 P}{\partial \rho^2}\right)_2 < 0$$

where $\rho$ = fluid density $s$ = entropy $P$ = thermodynamic pressure and $a$ = thermodynamic speed of sound, defined as $a = \sqrt{\frac{\partial P}{\partial \rho}}$ In this way, the strength of the vehicle's shock system is significantly weakened so that sonic boom can be reduced in a controlled fashion as the vehicle flies over land regions.

In general, the present invention actively weakens the strength of the shock waves by causing the well-known Rankine-Hugoniot Jump Conditions for shock wave generation associated with sonic boom (i.e., in the supersonic and hypersonic flight regimes) to be violated. That is, the present invention causes the Rankine-Hugoniot Jump Conditions to be violated by physically changing the values of flow parameters or variables downstream or aft of the shock as dictated by the Rankine-Hugoniot Jump Conditions for the same upstream conditions or freestream. This will be explained further with references to FIGS. 2A and 2B.

During atmospheric flight, at least one attribute being experienced by the vehicle is sensed directly or otherwise determined from sensed attributes. The attributes can include air pressure along the vehicle's outer mold line, Mach number along the vehicle's outer mold line, air density along the vehicle's outer mold line, air total energy along the vehicle's outer mold line, and air temperature along the vehicle's outer mold line. The number of sensing locations and their exact sensing positions are not limitations of the present invention as these will vary with vehicle design.

The sensed/determined attribute(s) are used to actively control the injection of a non-heated, non-plasma-producing gas into a local external flowfield of the vehicle (e.g., the vehicle's upstream flowfield) from at least one strategic surface location along the vehicle's outer mold line (e.g., at or along the leading edge surfaces). The pressure and/or mass flow rate of the gas so-injected in long penetration mode are adjusted based on the attribute(s) so-sensed such that the Rankine-Hugonoit Jump Conditions are violated and the strength of the shock waves is weakened at the vehicle's outer mold line.

Figure 2A:
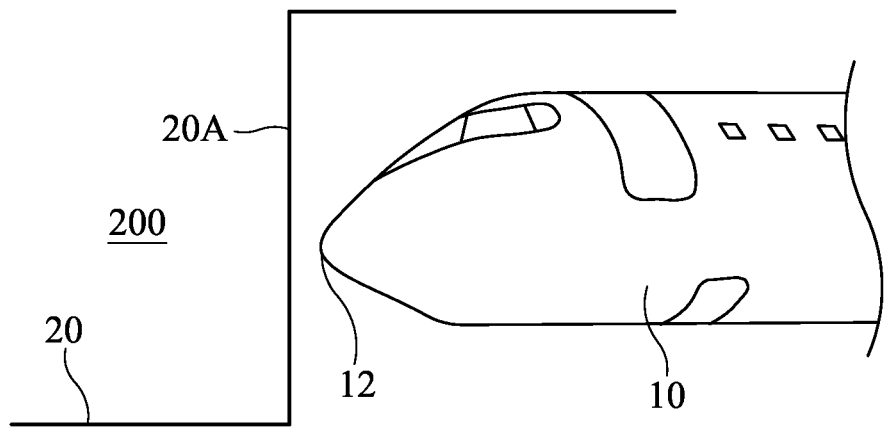
FIG. 2A is a diagrammatic view of the Rankine-Hugoniot Jump Conditions associated with shock resulting in sonic boom.

FIG. 2A illustrates the Rankine-Hugoniot Jump Conditions associated with shock that results in sonic boom. That is, shock associated with sonic boom occurs when there is a sudden change in the pressure curve 20 (i.e., the vertical portion 20A of curve 20) at a leading edge surface (e.g., nose 12 of aircraft 10). This condition occurs when aircraft 10 transitions to and travels in the supersonic (or hypersonic) flight regimes. The flight-related attribute relationships ahead of and behind shock 20A are as follows where the subscript "1" denotes conditions ahead of shock 20A and the subscript "2" denotes conditions aft of shock 20A. As is known in the art, shock associated with sonic boom is achieved when the following conditions are met:

Pressure (P) at vehicle's outer mold line: $P_1 < P_2$
Temperature (T) at vehicle's outer mold line: $T_1 < T_2$
Air density (D) at vehicle's outer mold line: $\rho_1 < \rho_2$
Mach number (M) at vehicle's outer mold line: $M_1 < M_2$
Specific volume (V) at vehicle's outer mold line: $V_1 > V_2$ See, for example, standard supersonic conditions listed in "Equations, Tables and Charts for Compressible Flows," NACA Report No. 1135, 1953.

Figure 2B:
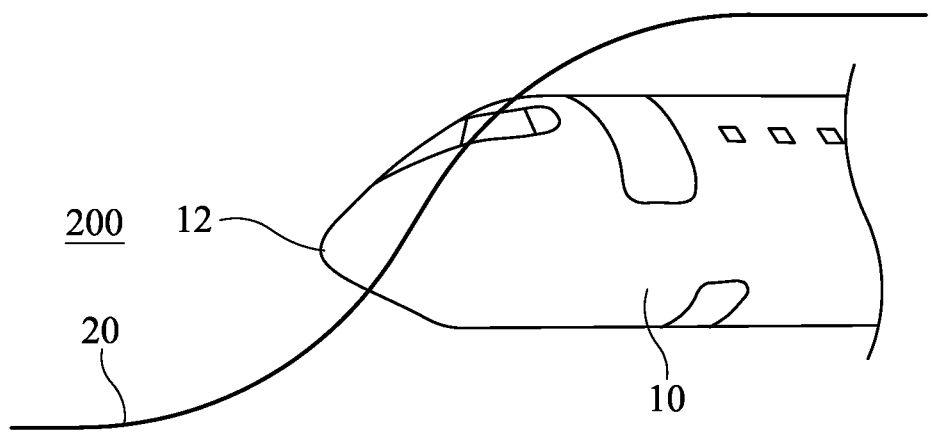
FIG. 2B is a diagrammatic view of shock when the Rankine-Hugoniot Jump Conditions are violated in the supersonic flight regime in accordance with the present invention.

FIG. 2B illustrates how the pressure curve 20 is modified when one or more of the Rankine-Hugoniot Jump Conditions (associated with sonic boom) are violated as aircraft 10 goes supersonic. In general, the present invention actively disrupts one or more of the flow parameters required for the (sonic boom) Rankine-Hugoniot Jump Conditions such that pressure curve 20 no longer experiences the sudden change in pressure at (for example) nose 12 when aircraft 10 goes supersonic. By preventing the sudden change in pressure causing shock 20A (FIG. 2A) such that the increase in pressure curve 20 is "softened" as in FIG. 2B, the present invention actively weakens the shock thereby resulting in the gently increasing pressure curve 20 illustrated in FIG. 2B. The present invention causes "softening" of pressure curve 20 (FIG. 2B) by physically changing the values of one or more flow parameters an upstream flow field of aircraft 10 thereby preventing the formation of a shock. That is, one of more of pressure along the vehicle's outer mold line, air density along the vehicle's outer mold line, air total energy along the vehicle's outer mold line, air temperature along the vehicle's outer mold line, and Mach number along the vehicle's outer mold line must be kept lower than that dictated by the Rankine-Hugoniot Jump Conditions associated with sonic boom.

In the present invention, the physical changing of the values of one or more of the above-described flow parameters is achieved through the above-mentioned injection of non-heated, non-plasma-producing gas in long penetration mode into an upstream flowfield of the vehicle. The pressure and/or mass flow rate of the gas so-injected in long penetration mode are adjusted based on the sensed/determined attribute(s). A variety of systems for implementing the above-described method will be discussed below with reference to FIGS. 3-5.

Figure 3:
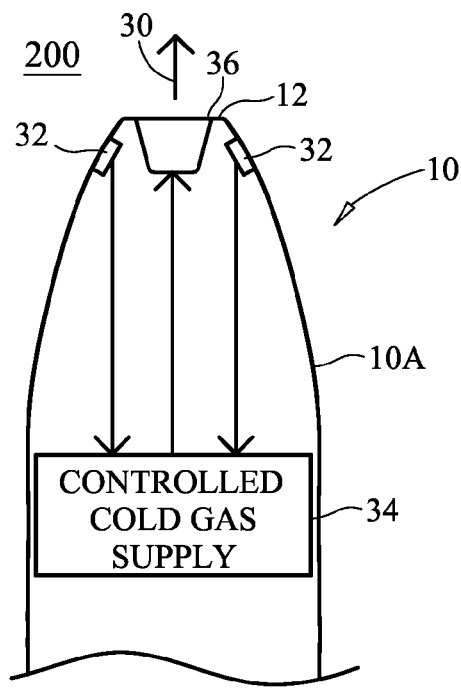
FIG. 3 is a schematic view of a portion of a vehicle illustrating a leading edge surface thereof with the vehicle being equipped with a system for weakening shock wave strength at the leading edge surface in accordance with an embodiment of the present invention.

In FIG. 3, a schematic view of a portion of aircraft 10 with a (leading edge) nose 12 is illustrated flying into the upstream flowfield or freestream 200. For purpose of the present invention, it will be assumed that aircraft 10 is transitioning to or traveling in a supersonic or hypersonic flight regime. As will be explained below, an advantage of the present invention is the ability to adapt its operation to the particular flight regime of aircraft 10 and effects being experienced thereby. It is to be understood that the present invention can be extended to any aircraft or spacecraft capable of supersonic or hypersonic atmospheric flight, and further includes vehicles experiencing extended atmospheric flight and vehicles experiencing atmospheric ascent or re-entry.

In general, aircraft 10 is equipped to inject a controlled flow (indicated by arrow 30 in FIG. 3) of a non-heated, non-plasma-producing gas also known as a "cold" gas in long penetration mode into upstream flowfield 200. By actively controlling the mass flow rate, velocity and/or pressure of flow 30, one or more of the above-described flow parameters can be actively disrupted as aircraft 10 transitions to and/or travels in the supersonic or hypersonic flight regimes. To achieve such active and adaptive control, the present invention employs a closed-loop control system defined generally by one or more sensors 32, a controlled cold gas supply 34, and one or more nozzles 36 for injecting controlled flow 30 in long penetration mode into upstream flowfield 200.

Sensors 32 are selected and positioned to sense attributes being experienced by aircraft 10 at one or more locations along the aircraft's outer mold line 10A. Some attributes not capable of being sensed directly can be indirectly determined/derived from those attributes that can be sensed directly as would be understood by one of ordinary skill in the art. Sensing can occur before aircraft 10 enters the supersonic or hypersonic flight regime, as aircraft 10 enters the supersonic or hypersonic flight regimes, and/or during the time that aircraft 10 is flying in the supersonic or hypersonic flight regimes without departing from the scope of the present invention.

Controlled cold gas supply 34 provides a controlled flow of a cold gas to nozzle(s) 36 based on the attributes sensed by sensors 32 (or attributes determined using the sensed attributes) at any given time during the flight of aircraft 10. The controlled flow of cold gas is, in turn, injected in long penetration mode as controlled flow 30 into upstream flowfield 200. The particular mass flow rate and pressure of the cold gas supplied by gas supply 34 is regulated based on the outputs of sensors 32 (and/or attributes determined using the sensor data) and the type of flight regime (e.g., supersonic or hypersonic) being experienced by aircraft 10. The cold gas delivered to nozzle(s) 36 can originate from an onboard storage supply thereof, an aircraft's engine air supply and/or from ambient air, or any combination of these supply methods, without departing from the scope of the present invention.

Nozzle(s) 36 can be any of a variety of nozzle designs capable of injecting controlled flow 30 in long penetration mode at a velocity that is typically sonic or supersonic. The particular nozzle design is not a limitation of the present invention. However, in an effort to make the present invention applicable to a wide variety of vehicle types, a nozzle of the present invention could be configured to present uniform or standardized outside dimensions regardless of the particular nozzle design so that the nozzle could be readily fitted into a standard-sized receptacle.

In operation, as aircraft 10 travels at speeds transitioning to or within the supersonic or hypersonic regimes, sensors 32 continually provide attribute information to cold gas supply 34. The attribute information and velocity of aircraft 10 are used by cold gas supply 34 to adjust controlled flow 30 in long penetration mode to weaken the strength of the shock at (in the illustrated example) nose 12 as described above. Thus, the present invention is a single comprehensive system approach that adapts to a variety of vehicle speeds in flight.

Figure 4:
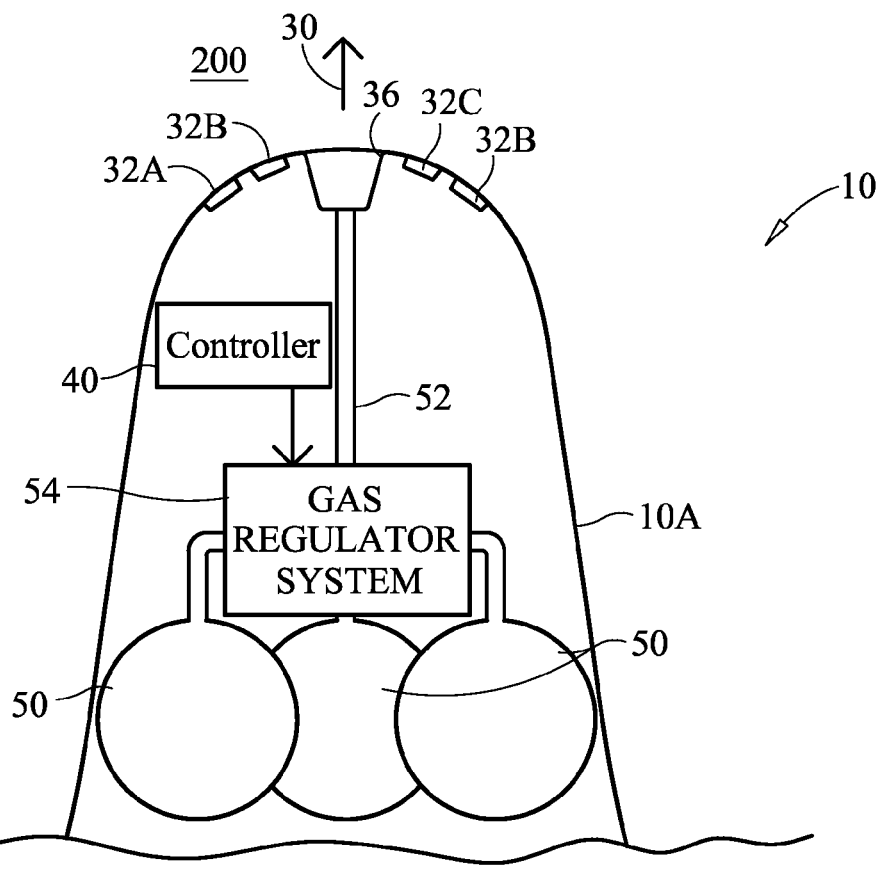
FIG. 4 is a more detailed schematic view of a portion of a vehicle equipped with an onboard cold gas supply and delivery system.

Another embodiment of the present invention is illustrated in FIG. 4 where aircraft 10 is equipped with an onboard cold gas supply and delivery system. A variety of sensors 32A-32D can be positioned on aircraft 10 along the outer mold line 10A thereof. The outputs of sensors 32A-32D are input to a controller 40 provided onboard aircraft 10. For clarity of illustration, signal lines coupling each sensor to controller 40 have been omitted. Controller 40 uses the sensor outputs along with current vehicle speed information (e.g., provided by other well known systems) to develop control signals that regulate the flow rate and pressure of a cold gas supplied to nozzle 36. In the illustrated embodiment, the cold gas is stored in one or more pressurized tanks 50 onboard aircraft 10. When needed, the pressurized cold gas is delivered to nozzle 36 via a feed line 52 in a controlled fashion by means of a gas regulator system 54 (e.g., manifold, regulator, control valves, pressure sensors, flow rate sensors, etc.). Controller 40 regulates the operation of gas regulator system 54.

Although the previous embodiments of the present invention have been described using a single nozzle at the aircraft's nose with the nozzle exit facing the aircraft's upstream flowfield, the present invention is not so limited. For example, a plurality of nozzles or a long slot/nozzle could be provided at one or more leading edge surface locations without departing from the scope of the present invention. Furthermore, a controlled flow of non-heated, non-plasma-producing gas can be injected in long penetration mode into a vehicle's flowfield from any surface location on a vehicle that faces a local external flowfield such as the upstream flowfield. For example, the present invention could be used on aircraft where surface locations facing the upstream flowfield could also include a variety of other leading edge regions of the aircraft's wings, stabilizers, etc. Still further, the present invention can be employed for use in the atmospheric re-entry regime of flight. In this case, the upstream flowfield is a re-entry flowfield that envelopes the vehicle as it re-enters a planetary atmosphere. The non-heated, non-plasma-producing gas is injected in long penetration mode from the location(s) on the vehicle facing the re-entry flowfield to actively weaken the shock associated with sonic boom as described above.

Figure 5:
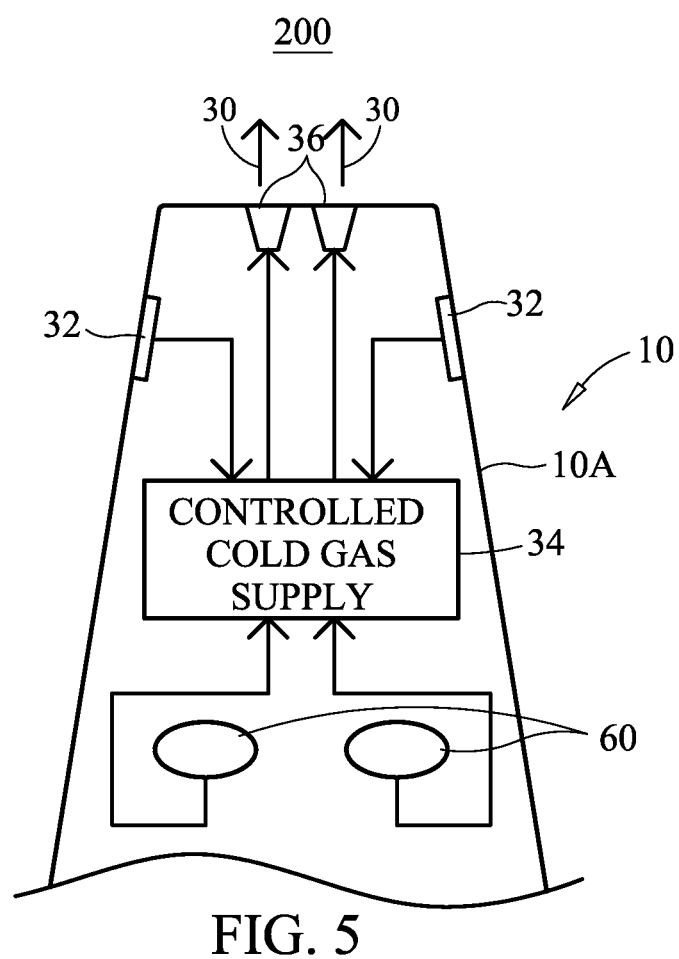
FIG. 5 is a schematic view of a portion of a vehicle equipped with an ambient-air cold gas supply and delivery system.

Depending on the type of vehicle, the present invention could utilize ambient air as the cold gas thereby minimizing or eliminating the need to store an onboard supply of cold gas so that the present invention's operation can be sustained during sustained flight or cruise. Accordingly, FIG. 5 illustrates a system for collecting, pressurizing and delivering ambient air to one or more nozzles 36 provided in aircraft 10. Ambient atmospheric gases can be collected via, for example, inlets 60 (e.g., existing engine inlets receiving ambient air, specifically-provided vents exposed to ambient air, and combinations thereof), and then directed by cold gas supply 34 in order to supply nozzles 36 so that flow 30 is controlled as described above.

The advantages of the present invention are numerous. Vehicles traveling in supersonic or hypersonic atmospheric flight are provided with a single comprehensive method and system for actively weakening the strength of shock waves at leading edge surfaces of the vehicle to thereby reduce or eliminate the effects of sonic boom in a controlled fashion as the vehicle flies over (populated) land regions. A single system makes adjustments to handle a variety of phenomena experienced over a range of supersonic or hypersonic Mach numbers. The cold gas can be stored onboard, be derived from engine bleed air, utilize ambient air directly, etc., thereby making the approach a viable alternative for a variety of vehicle types.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of weakening shock wave strength at leading edge surfaces of a vehicle in atmospheric flight, comprising the steps of:

determining at least one attribute along a vehicle's outer mold line that is being experienced by the vehicle during atmospheric flight, said at least one attribute selected from the group consisting of air pressure, air temperature, air density, air total energy, and Mach number;

injecting a non-heated, non-plasma-producing gas into a local external flowfield of the vehicle from at least one leading-edge surface location along the vehicle's outer mold line; and adjusting at least one of pressure and mass flow rate of said gas so-injected based on said at least one attribute so-determined in order to cause a Rankine-Hugoniot Jump Condition along the vehicle's outer mold line to be violated.

2. A method according to claim 1, wherein said step of injecting includes the step of storing a supply of said gas onboard the vehicle.

3. A method according to claim 1, wherein said gas includes air from an ambient atmosphere, and wherein said step of injecting includes the step of directing the air from the ambient atmosphere to said at least one leading-edge surface location.

4. A method according to claim 1, wherein said step of determining occurs before the vehicle enters a supersonic flight regime of atmospheric flight.

5. A method according to claim 1, wherein said step of determining occurs as the vehicle enters a supersonic flight regime of atmospheric flight.

6. A method according to claim 1, wherein said step of determining occurs after the vehicle enters a supersonic flight regime of atmospheric flight.

7. A method according to claim 1, wherein said step of injecting occurs before the vehicle enters a supersonic flight regime of atmospheric flight.

8. A method according to claim 1, wherein said step of injecting occurs as the vehicle enters a supersonic flight regime of atmospheric flight.

9. A method according to claim 1, wherein said step of injecting occurs after the vehicle enters a supersonic flight regime of atmospheric flight.

10. A method of weakening shock wave strength at leading edge surfaces of a vehicle in atmospheric flight, comprising the steps of:

sensing at least one flight-related attribute along a vehicle's outer mold line that is being experienced by the vehicle in supersonic flight;

injecting, while the vehicle is in supersonic flight, a non-heated, non-plasma-producing gas into an upstream flowfield of the vehicle from at least one leading-edge surface location along the vehicle's outer mold line; and adjusting, while the vehicle is in supersonic flight, at least one of pressure and mass flow rate of said gas so-injected based on said at least one flight-related attribute so-sensed in order to cause a Rankine-Hugoniot Jump Condition along the vehicle's outer mold line to be violated.

11. A method according to claim 10, wherein said step of injecting includes the step of storing a supply of said gas onboard the vehicle.

12. A method according to claim 10, wherein said gas includes air from an ambient atmosphere, and wherein said step of injecting includes the step of directing the air from the ambient atmosphere to said at least one leading-edge surface location.

13. A method according to claim 10, wherein said step of sensing occurs before, during, and after the vehicle attains said supersonic flight.

14. A system for weakening shock wave strength at leading edge surfaces of a vehicle in atmospheric flight, comprising:

a plurality of sensors adapted to be coupled to a vehicle capable of atmospheric flight, each of said sensors capable of sensing a flight-related attribute along the vehicle's outer mold line;

at least one nozzle adapted to have its exit located at a location at the vehicle's surface and adapted to face an upstream flowfield of the vehicle;

a cold gas supply system adapted to be mounted in the vehicle and coupled to each said nozzle for delivering a cold gas thereto, wherein a non-heated, non-plasma-producing gas is injected by each said nozzle into the upstream flowfield; and a controller coupled to said sensors and said cold gas supply system for controlling at least one of pressure and mass flow rate of said gas so-injected by each said nozzle based on each said attribute so-sensed in order to cause a Rankine-Hugoniot Jump Condition along the vehicle's outer mold line to be violated.

15. A system as in claim 14, wherein said sensors are selected from the group consisting of pressure sensors, temperature sensors, and density sensors.

16. A system as in claim 14, wherein said cold gas supply system includes means for storing a supply of said cold gas onboard the vehicle.

17. A system as in claim 14, wherein said cold gas comprises ambient air and wherein said cold gas supply system includes means for delivering the ambient air to each said nozzle.

18. A system as in claim 14, wherein each said nozzle is selected from the group consisting of sonic and supersonic nozzles.

* * * * *